(No Model.)
J. L. GETHINS.
GALVANIC BATTERY.
No. 393,639. Patented Nov. 27, 1888.
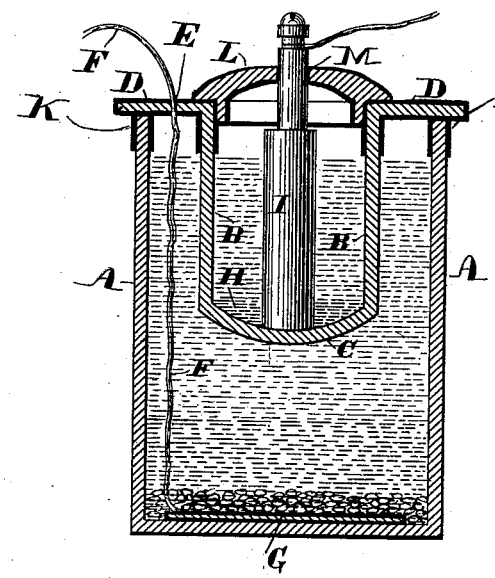
WITNESSES:
INVENTOR:

UNITED STATES PATENT OFFICE.

JAMES L. GETHINS, OF BOSTON, MASSACHUSETTS.

GALVANIC BATTERY.

SPECIFICATION forming part of Letters Patent No. 393,639, dated November 27, 1888.

Application filed February 7, 1887. Serial No. 226,767. (No model.)

*To all whom it may concern:*

Be it known that I, JAMES L. GETHINS, of Boston, Massachusetts, have invented a new and useful Improvement in Galvanic Batteries, of which the following is a specification.

My invention relates to galvanic batteries of the "gravity" type; and it has for its object the construction of such a battery that will be constant in its action and whose operation will not be interrupted or weakened by the accumulation of crystals of sulphate of zinc, which, as is well known in ordinary batteries of this kind, creep over and cover the whole plant of batteries, requiring constant attention and causing considerable annoyance.

The annexed drawing represents in vertical section a battery embodying my invention.

A jar, A, of glass, ebonite, or glazed earthenware, or any other suitable insulating material, forms the receptacle of my battery, as is usual. The porous cut B is formed with a depressed or concave bottom, C, and with a flange, D, of such size as to reach over the edge of the jar A and constitute a cover for the same. At one point, E, this flange is perforated for the admission of an insulated copper wire, F, which leads down into the jar and is in electrical connection with a copper plate or electrode, G. The porous cup B reaches down into the jar to about one-half of its depth, more or less. The concavity formed by its bottom is filled with mercury, as is indicated at H, and a zinc electrode, I, placed in the porous cup, rests at the bottom of the same, partially immersed in the mercury, whereby this electrode is constantly kept properly amalgamated. The flange D of the porous cup and the upper portion of the latter are glazed, and a heavy coat of asphaltum paint is applied to this part of the cup and to the flange, as indicated by heavy shading in the drawing. The upper portion of jar A, for about the length of an inch, is also covered with asphaltum paint, as indicated at K. This paint adheres well to the materials employed in the construction of the jar and porous cup. It is not liable to peal off, as is the case with paraffine and other like materials, which are sometimes employed in batteries.
There is a cover, L, of wood or other non-metallic material, which fits the porous cup and has a central perforation, M, which permits the stem of the electrode I to pass through and project a short distance above it. This cover is also preferably painted with asphaltum paint, although this is not absolutely necessary.

The battery is charged with crystals of sulphate of copper covering the copper electrode and with water both in the jar and in the porous cup, which water may be slightly acidulated by the addition of a small quantity of sulphuric acid. When the circuit of this battery is closed there will be two layers of liquids—solutions of sulphate of copper and sulphate of zinc— formed, as is well understood by those skilled in the art. The lighter liquid—the solution of sulphate of zinc—will be on top, and after saturation crystals of sulphate of zinc are formed, which in ordinary batteries rise and creep over the edges of the jar and porous cup. In my battery this is effectually prevented by the asphaltum paint on the upper part of both the jar and the porous cup, to which paint this solution of sulphate of zinc does not adhere, and which therefore it cannot pass by capillary action. The solution of sulphate of zinc in the space between the jar and the porous cup also gives rise to the formation of crystals within that space, which space is closed by the flange D, whereby an additional guard against the creeping over of the crystals is formed.

I have found this battery constant in action and very convenient in use. It is always clean on the outside and requires very little attention.

What I claim as my invention is—

1. In a galvano-electric battery, the combination of a jar of glass or equivalent material coated with asphaltum paint about its edge with a porous cup provided with a glazed flange forming a cover to the jar, said flange being perforated at one point for the admission of a conductor and having a coat of asphaltum paint, and a cover of non-metallic material for the porous cup perforated for the admission of an electrode, substantially as described.

2. In a galvanic battery, the combination of a jar of insulating material coated with asphaltum paint about its upper edge with a porous cup having a glazed flange forming a cover to the jar and coated with asphaltum paint, substantially as described.

3. In a galvanic battery, the combination of a porous cup having a concavely-curved bottom, with mercury in said concavity, and a zinc electrode dipping into the mercury, substantially as described.

4. In a galvanic battery, the combination of a jar of insulating material for the reception of one electrode and a porous cup for the reception of the other electrode, said cup being provided with a perforated flange forming a cover to the jar, with a cover for the porous cup perforated for the admission of the upper end of the electrode in the cup, substantially as described.

JAS. L. GETHINS.

Witnesses:
WM. S. ROGERS,
WALDRON BATES.